Figure 1:
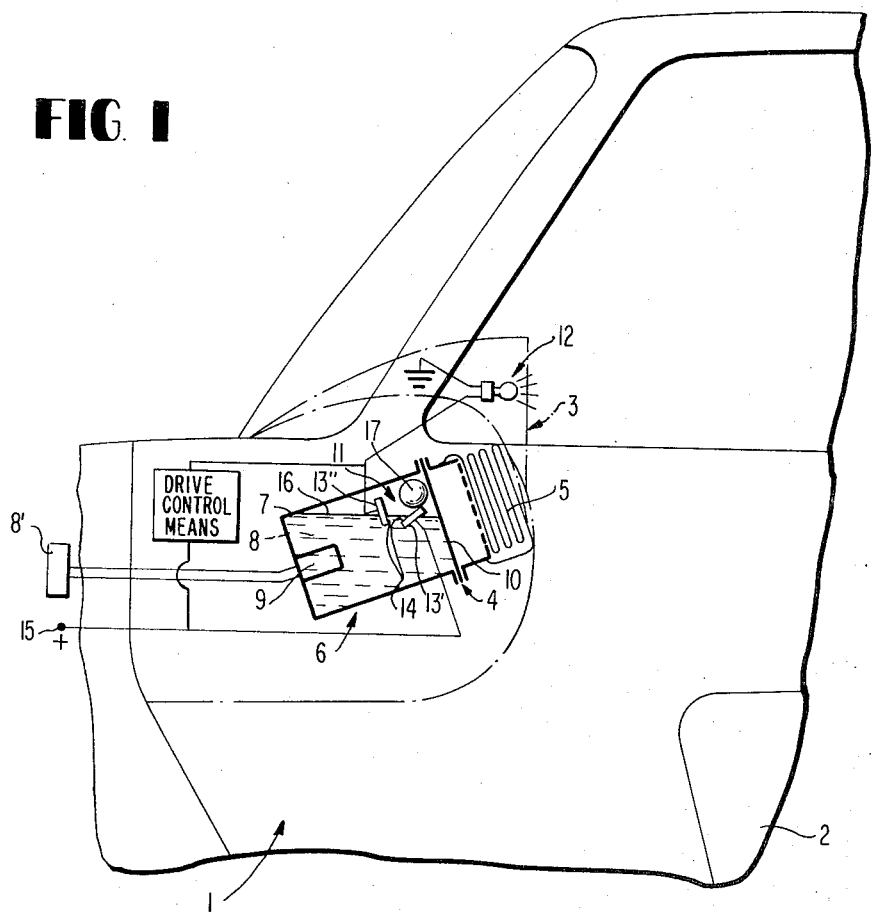

United States Patent
Schiesterl et al.

[11] 3,825,278
[45] July 23, 1974

[54] PASSENGER PROTECTIVE INSTALLATION FOR VEHICLES, ESPECIALLY FOR MOTOR VEHICLES

[75] Inventors: Gerhard Schiesterl, Stuttgart; Helmut Wolf, Nellingen, both of Germany

[73] Assignee: Daimler-Benz Aktiengesellschaft, Stuttgart-Unterturkheim, Germany

[22] Filed: Mar. 24, 1972

[21] Appl. No.: 237,641

[30] Foreign Application Priority Data
Mar. 25, 1971 Germany............................ 2114475

[52] U.S. Cl............. 28/150 AB, 180/103, 340/53, 340/59, 340/244 A, 340/244 D
[51] Int. Cl............................................ B60r 21/08
[58] Field of Search........ 280/150 AB; 73/305, 309, 73/313; 340/244 R, 244 A, 244 B, 244 C, 244 D, 244 E, 59; 180/103

[56] References Cited
UNITED STATES PATENTS

| | | | |
|---|---|---|---|
| 786,135 | 3/1905 | Moody | 340/244 B |
| 2,661,411 | 12/1953 | Berger | 340/244 E |
| 2,744,177 | 5/1956 | Barber | 340/244 E |
| 2,768,700 | 10/1956 | Miller | 180/103 |
| 2,819,363 | 1/1958 | Narzisi | 340/244 E |
| 2,899,214 | 8/1959 | D'Antini | 280/150 AB |
| 3,340,523 | 9/1967 | Whitman | 180/82 C |
| 3,618,974 | 11/1971 | Chute | 280/150 AB |
| 3,622,974 | 11/1971 | Best | 280/150 AB |

Primary Examiner—David Schonberg
Assistant Examiner—John P. Silverstrim
Attorney, Agent, or Firm—Craig & Antonelli

[57] ABSTRACT

A passenger protective installation for vehicles, especially motor vehicles which includes at least one air bag that is adapted to be inflated by means of a pressure gas when exceeding a predetermined deceleration value of the motor vehicle, whereby the pressure gas is produced from liquefied gas in a pressure gas producer that includes a tank for the liquefied gas; a float with an electrically conductive surface is arranged in the tank to which are coordinated contact surfaces separated from one another which, in relation to the liquid level, converge toward one another in the downward direction at least within the upper area thereof and which are so arranged that the float abuts at the contact surfaces when the liquid level is disposed below the predetermined minimum level of the electrically non-conductive liquid gas; the abutment of the float at the contact surfaces thereby closes a circuit which includes or operates an indicating and/or control device.

1 Claim, 3 Drawing Figures

PATENTED JUL 23 1974   3,825,278

PASSENGER PROTECTIVE INSTALLATION FOR VEHICLES, ESPECIALLY FOR MOTOR VEHICLES

The present invention relates to a passenger protective installation for vehicles, especially for motor vehicles, which includes at least one air bag which in case of exceeding a predetermined deceleration value of the motor vehicle is inflatable by means of a pressure gas that is developed from liquefied gas in a pressure gas producer which includes a storage tank for the liquefied gas.

It is a prerequisite for a completely satisfactory functioning of the passenger protective installation that always such a large quantity of liquid gas is contained in the tank that a pressure gas quantity can be developed in the pressure gas producer which is sufficient for the filling of the air bag, i.e., for the inflation thereof to a predetermined minimum pressure. The present invention is now concerned with the task to provide a monitoring system by means of which a drop in the liquefied gas contained in the storage tank below a predetermined minimum level and thus a damage of the passenger protection installation is signalled.

According to the present invention, this is attained with a passenger protective installation of the aforementioned type in that a float member with an electrically conductive surface is arranged in the tank, whereby contact surfaces separated from one another are coordinated to the float member which, in relation to the liquid level, converge toward one another at least in their upper area and which are so arranged that the float member with a liquid level below a predetermined minimum level of the electrically non-conductive liquid gas, abuts at the contact surfaces and therewith closes a circuit in which is included an indicating and/or control installation. A simple and operationally reliable monitoring installation is created by the construction according to the present invention, by means of which a failure of the passenger protective installation cannot only be indicated or signalled to the vehicle user but possibly also conventional control elements can be actuated or shifted which forcibly bring about an interruption of the driving operation.

In order to reliably maintain the connection between the contact surfaces to be established by way of the float member, independently also of any vibrations that may occur during the vehicle operation and thus to keep the circuit also closed when the float member, for example, with a complete emptying of the reservoir tank is no longer supported by the liquid, it may be of advantage if the mutually inclined contact surfaces form mutually opposite boundary surfaces of a collecting space for the float member.

According to a further development of the present invention, the contact surfaces may be provided at contact elements disposed mutually inclined and arranged insulated opposite the walls of the tank which are arranged and/or constructed with advantage in such a manner that the float member during abutment at the contact surface connected with a voltage source is completely free with respect to the wall of the tank, i.e., is completely spaced therefrom. An undesirable contact between the contact surfaces and the walls of the tank, when the tank consists of a conducting material, for example, of metal, can be prevented within the scope of the present invention also in that the wall inner surface of the tank is insulated within the movement area of the float.

In order to prevent a contact of the float with the wall of the tank which under certain circumstances may be undesired, and in order to further assure a correct position of the float with respect to the contact surfaces with a normal liquid level, it may be further of advantage within the scope of the present invention to limit the movement range of the float with respect to the contact surfaces by means of a liquid-permeable cover extending at least above the contact elements. However, within the scope of the present invention, the movement range of the float with respect to the contact surfaces can also be limited by an anchoring connection or link whose length is smaller than the distance of the contact surfaces to the tank walls. Such an anchoring connection can be constituted in a simple manner, for example, by a filament, cord, chain-like element or the like mounted at one of the contact elements and of conventional non-conductive material.

A relatively large indicating accuracy can be achieved with the arrangement according to the present invention in that the contact elements are provided within the upper area of the tank arranged with an inclined axis with respect to a horizontal plane.

A particularly simple embodiment of the monitoring installation within the scope of the present invention can be achieved in that with an insulated arrangement of the tank and with an at least partially conductive inner surface thereof, one contact surface is constituted by a wall section of the tank.

If the passenger protection installation according to the present invention is to be used for a motor vehicle with a rototable steering column, then a particularly simple and appropriate construction results if the storage tank is arranged coaxially to the steering column and is rotatable together with the latter, and if the contact surfaces concentrically surround the axis of rotation. At least one of the contact surfaces can be formed thereby with advantage by the outer $\phi$ or generating surfaces of a contact element of truncated conical shape.

With an axis of the steering column or steering spindle inclined with respect to a horizontal plane, a particularly simple over-all construction can be achieved in that one of the contact surfaces is constituted by the generating surfaces of a cylindrical contact element. A contact element may be coordinated with advantage both to such a cylindrical contact element as also to a contact element of truncated conical shape, whose contact surface is constituted by a wall surface of a disk-shaped contact element extending in a plane perpendicular to the axis of the steering column or steering spindle.

Within the scope of the present invention, a control light arranged within the area of the instrument panel of the vehicle and formed by a lamp may serve as indicating installation in its simplest manner. The control light may also additionally serve within the scope of the present invention as indicating device for the inoperability of the sensor system, by way of which is registered when the vehicle exceeds the predetermined deceleration value, during which the pressure gas producer has to be activated for the inflation of the air bag, for which purpose an explosive cartridge disposed in the tank is ignited by way of the sensor, which produces the heat necessary for converting the gas from its liquid into its gaseous condition.

Accordingly, it is an object of the present invention to provide a passenger protective installation for vehicles, especially motor vehicles, which eliminates by simple means the aforementioned shortcomings encountered in the prior art systems.

Another object of the present invention resides in a passenger protective installation for motor vehicles which reliably monitors the presence of a sufficient quantity of liquefied gas to assure proper inflation of the air bag in case of need.

A further object of the present invention resides in a monitoring system for monitoring the sufficiency and operating readiness of the pressure gas producer, which is simple in construction and reliable in operation, independently of vibrations and shocks that may occur during the operation of the vehicle.

A further object of the present invention resides in a monitoring system of the type described above which avoids erroneous indications due to improper contacts without impairment of a relatively large indicating accuracy.

Figure 2:
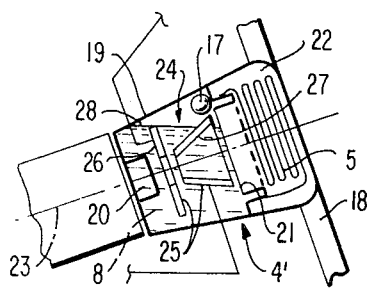
Figure 3:
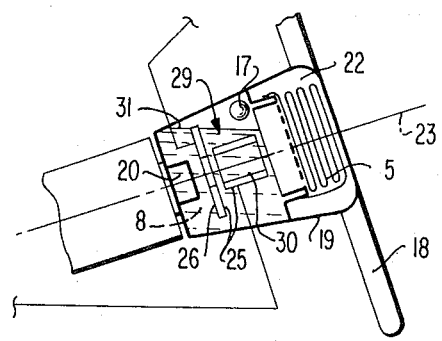

These and other objects, features and advantages of the present invention will become apparent from the following description when taken in connection with the accompanying drawing which shows, for purposes of illustration only, several embodiments in accordance with the present invention, and wherein:

FIG. 1 is a schematic view of a portion of a cell of a passenger motor vehicle with a passenger protective installation according to the present invention arranged within the area in front of a front seat of the vehicle;

FIG. 2 is a partial schematic view of a modified embodiment of a passenger protective installation according to the present invention and similar to FIG. 1, in which differing from the embodiment of FIG. 1, a protective installation coordinated to the driver seat is illustrated which is included into the steering column adjacent the steering wheel; and FIG. 3 is a partial schematic view similar to FIG. 2 of a still further modified embodiment of a protective installation according to the present invention.

Referring now to the drawing wherein like reference numerals are used throughout the various views to designate like parts, and more particularly to FIG. 1, a section of a cell generally designated by reference numeral 1 of a passenger motor vehicle is schematically illustrated in this figure in which a passenger protective installation generally designated by reference numeral 4 according to the present invention is coordinated to a front seat 2 within the area of the instrument panel 3. The passenger protective installation 4 includes an air bag 5 which is illustrated herein only in the folded-together condition and which is inflated by means of pressure gas when the motor vehicle exceeds a predetermined deceleration value. The necessary pressure gas is developed during activation of a pressure gas producer generally designated by reference numeral 6 which is part of the passenger protective installation 4.

The pressure gas producer 6 includes a storage tank or container 7 which is nearly completely filled with liquefied gas 8. For the activation of the gas producer 6, an explosive cartridge 9 arranged on the inside of the tank 7 is ignited by way of a conventional sensor 8' which registers when the motor vehicle exceeds a predetermined deceleration value; the heat necessary for the conversion of the gas from its liquid into its gaseous condition is developed by the explosive cartridge 9. The sensor 8' is electrically connected with the explosive cartridge 9. The gas, for example, Freon 12, is converted nearly instantaneously from its liquid condition into its gaseous condition by the heat liberated by the ignition of the explosive charge 9. A strong volume increase and a considerable pressure results therefrom, by means of which the cover 10 of the tank or container 7 is burst open so that the developed pressure gas can cause the air bag to unfold. However, it is also understood that the cover 10 may be burst open by auxiliary devices of any conventional construction not illustrated herein. Since a certain minimum gas quantity is necessary for the unfolding and inflation of the air bag to a predetermined minimum pressure, a certain minimum quantity of liquid gas 8 must always be present in the tank 7 as a prerequisite for the functioning ability, i.e., for the operating readiness of the passenger protective installation 4. The presence of this minimum quantity is detected and registered by the monitoring installation generally designated by reference numeral 11 according to the present invention, which when the liquid gas drops below a corresponding minimum level, triggers an indicating installation generally designated by reference numeral 12, i.e., in the given embodiment closes a circuit in which is provided a control lamp as indicating device 12.

The monitoring installation 11 is constituted in the embodiment according to FIG. 1 by two contact elements 13' and 13'' which include contact surfaces 14 that are electrically connected, on the one hand, with a voltage source 15 and, on the other, with the lamp serving as indicating device 12 whereby the latter is also connected with ground. Upon reaching or dropping below the minimum level 16 of the liquid gas, the contact surfaces 14 are electrically connected with each other by way of a float member 17 having a conductive surface, which is disposed at a distance above the contact surfaces 14 with a liquid level above the minimum level 16 and which comes to rest between the contact surfaces 14 of the contact elements 13' and 13'' when the liquid condition drops to the minimum level 16.

In order to prevent a contact between the contact surface 14, coordinated to the contact element 13 connected with the voltage source 15, and between the tank by way of the float member 17, either the contact element 13' may be so arranged and/or constructed that a simultaneous contact of a wall surface of the tank 7 and of the corresponding contact surface 14 is not possible or for example, also the wall of the tank 7 arranged in this embodiment at an inclination may be insulated in the upper tank area in which the contact elements 13' and 13'' are arranged. Such modifications are not illustrated for the sake of simplicity. Furthermore, other possibilities within the scope of the present invention and not illustrated herein for preventing such an undesired contact and for simultaneously securing a position of the float 17 which assures a dropping thereof between the contact surfaces 14 when the liquid level drops, consist in that, for example, a liquid-permeable cover (not shown) is provided extending at least above the contact elements 13', 13'' or in that the float 17 is connected by way of a connecting linkage (not shown) with one of the contact elements 13', 13''.

Since such modifications are well within the scope of a person skilled in the art, a detailed showing and description thereof is omitted for the sake of clarity.

A further embodiment of a passenger protective installation according to the present invention is illustrated in FIG. 2 by reference to a section of FIG. 1, whereby the passenger protective installation generally designated in this embodiment by reference numeral 4' is included in the support of the steering wheel 18. In particular, this is achieved, as illustrated, essentially in that a hollow deformation member 19, a so-called impact pot is coordinated to the steering wheel 18, which forms the transition from the steering wheel 18 to the steering spindle 20. The hollow deformation member 19 forms or surrounds a container or tank for the liquefied gas again designated by reference numeral 8, from which a hollow space 22 provided within the hub area of the steering wheel 18 is separated by means of a cover 21; the air bag is folded into the hollow space 22. As a result of its connection to the steering wheel 18, the deformation member 19 and therewith also the tank which is constituted by the deformation member 19 or surrounded thereby, is rotatable about the axis 23 of the steering spindle 20 during a rotation of the steering wheel 18.

The monitoring system generally designated in the embodiment according to FIG. 2 by reference numeral 24 is constituted in this embodiment by two contact surfaces 25 disposed coaxially to the axis of rotation 23 of the steering wheel 18 and of the steering spindle 20 and concentrically surrounding this axis. In this embodiment, on the one hand, the wall surface of a disk-shaped contact element 26 disposed perpendicular to the axis of rotation 23 of the steering spindle 20 and, on the other, the outer surfaces of a contact element 27 of truncated conical shape again disposed concentrically to the steering spindle axis 20 serve as contact surfaces 25. The two contact elements 26 and 27 are so arranged to one another that the float 17 forms a bridge between the two contact surfaces 25 when the liquid level drops below a predetermined minimum level indicated in this embodiment by reference numeral 28; as to the rest, the contact surfaces 25 are arranged as in FIG. 1 in a circuit (not shown) which is to be closed by the float member 17. Also with such an embodiment, conventional means of the type described above may again be provided with advantage limiting the movement range of the float 17 in relation to the contact surfaces 25 which, however, are again not illustrated for the sake of simplicity.

The embodiment illustrated in FIG. 3 differs from the embodiment according to FIG. 2 only in the construction of the monitoring system generally designated in this embodiment by reference numeral 29 which, with the same basic construction, includes in lieu of the contact element 27 of truncated conical shape used in FIG. 2, a similarly arranged contact element 30 which, however, is now of cylindrical construction. The circumferential wall surfaces of the contact element 30 constituted, for example, by a pipe section represents again one of the contact surfaces which as in the embodiment of FIG. 2 are designated by reference numeral 25. It is prerequisite in this embodiment for the automatic abutment of the float 17 at the two contact surfaces 25 when the liquid level drops below a predetermined minimum level indicated in FIG. 3 by reference numeral 31, that the steering spindle axis 23 extends at an inclination with respect to a horizontal plane and that, in relation to the inclination, the disk-shaped contact element 26 is disposed below the cylindrical contact element 30 as viewed in the axial direction. The embodiment of a monitoring system 24 illustrated in FIG. 2, in contrast thereto, by reason of the inclination of the contact surfaces 25 with respect to each other can be utilized without difficulty also when the steering spindle axis 23 extends horizontally.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A passenger protective installation for vehicles, especially motor vehicles, having an instrument panel, comprising: at least one air bag means disposed in the instrument panel, means connected to said air bag means for inflating the same, when the vehicle exceeds a predetermined deceleration value, said inflating means including a pressure gas producer means for developing a pressure gas from an electrically non-conducted liquefied gas, said gas producing means including a tank means for containing said liquefied gas, a float means disposed in said tank means, said float means being provided with electrically conductive surface means, spaced contact surface means disposed in said tank means including contact elements insulated with respect to said tank means, cooperable with said float means, said contact elements at least in the upper area thereof converging toward one another in the downward direction in relation to the liquid level of said liquefied gas and defining therebetween mutually opposite boundary surfaces of a collecting space for said float means, said float means abutting at the contact surface means when said liquid level is below a predetermined minimum level, and circuit means including said contact surface means and monitoring means, said circuit means being closed by engagement of said float means with said contact surface means, said monitoring means including an indicating means and a control means for interrupting the driving operation of the motor vehicle.

* * * * *